Jan. 20, 1970    R. M. DESCHAMPS    3,490,949
ANNULAR ELECTROCHEMICAL ACCUMULATOR HAVING
SPIRALLY WOUND ELECTRODES
Filed July 7, 1967      3 Sheets-Sheet 1
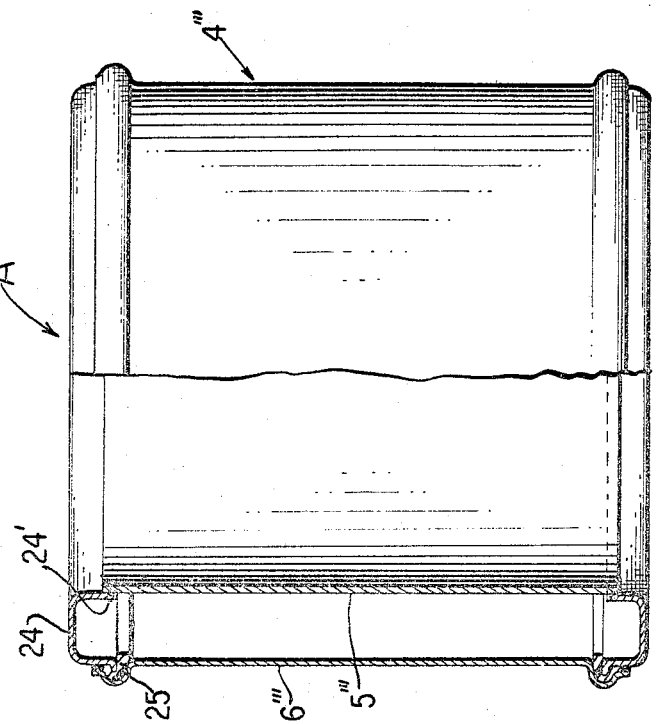
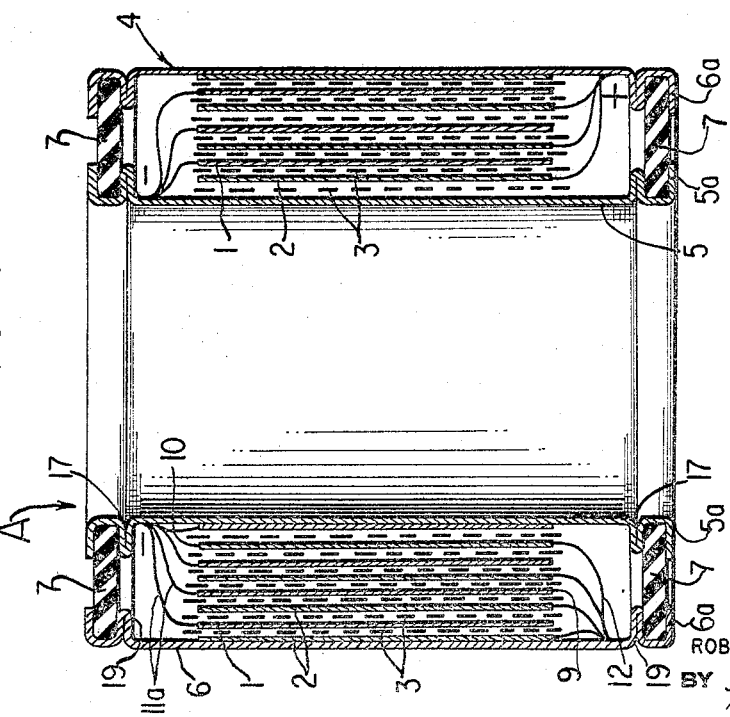
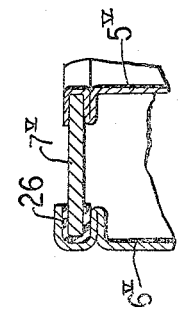
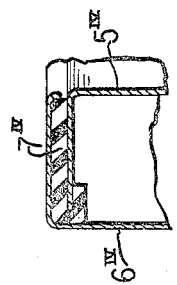
INVENTOR
ROBERT MARCEL DESCHAMPS
BY
ATTORNEYS

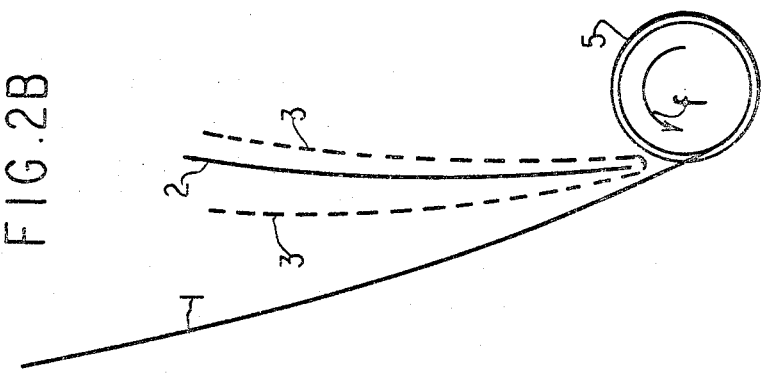
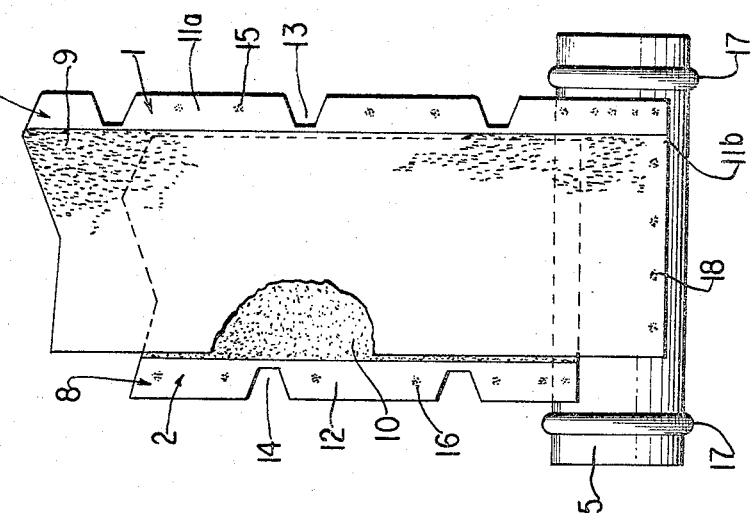

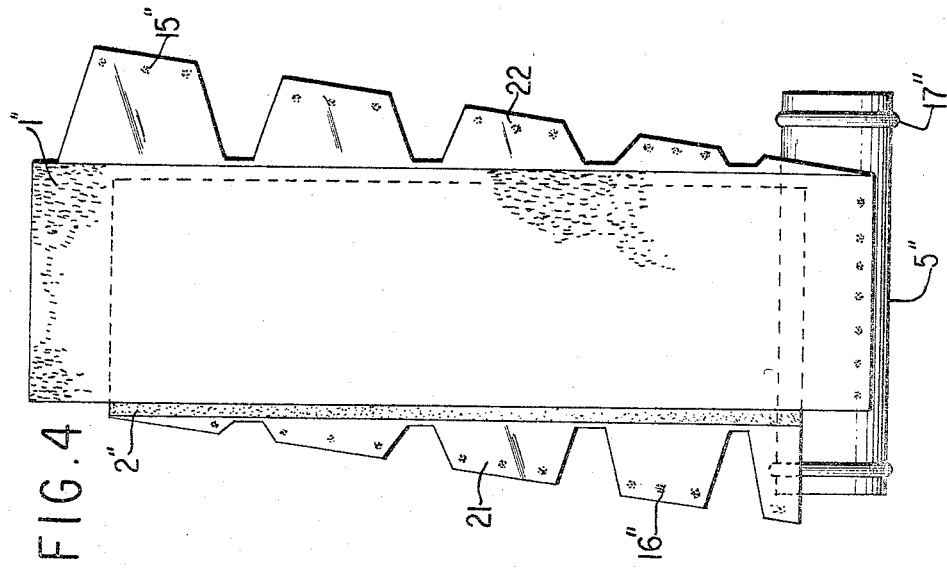
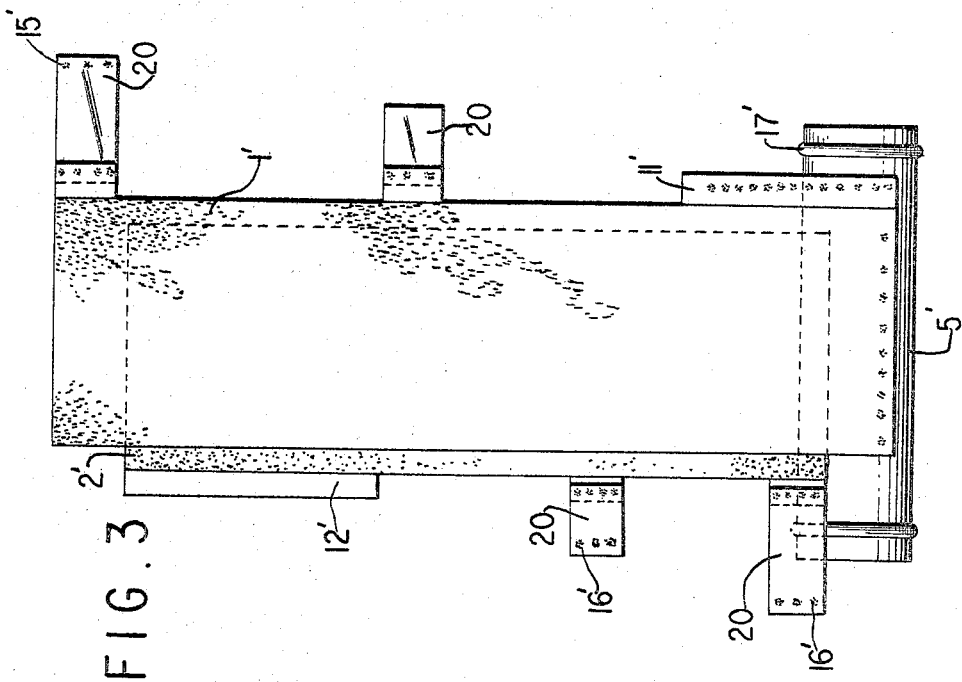

United States Patent Office 3,490,949
Patented Jan. 20, 1970

3,490,949
ANNULAR ELECTROCHEMICAL ACCUMULATOR HAVING SPIRALLY WOUND ELECTRODES
Robert Marcel Deschamps, Paris, France, assignor to Societe des Accumulateurs Fixes et de Traction (Societe Anonyme), Romainville, France, a company of France
Filed July 7, 1967, Ser. No. 651,759
Claims priority, application France, July 25, 1966, 70,694
Int. Cl. H01m 35/16
U.S. Cl. 136—13
10 Claims

ABSTRACT OF THE DISCLOSURE

An annular electrochemical accumulator having spirally wound positive and negative electrodes with an interposed separator and including electrolyte wherein the spiral assembly of electrodes and separator is enclosed between a pair of concentric cylindrical tubular metallic casing components, with end seals for the two components, said two casing components serving respectively as the electric terminals of the cells, the electrodes having portions bearing active electrode materials and bare portions which latter serve as current collectors are secured electrically to respective of the casing components or parts connected thereto as by welding or soldering.

BRIEF SUMMARY OF INVENTION

This invention relates to annular electrochemical generators, especially alkaline accumulators of cadmium-nickel type.

Annular accumulators have already been proposed. But such a structure implies the use of complicated electrodes or terminals, and thus no satisfactory solution has been found up to now.

A principal object and feature of the present invention is to provide annular electrochemical generators, especially alkaline accumulators of cadmium-nickel or cadmium-silver type that are easy to construct and have improved operating characteristics.

Another object and feature of the invention is to provide novel manufacturing processes for such generators.

Accumulators according to the invention are characterized by one or several of the following features:

(a) The outlet terminals are constituted by two metal casing components that are insulated from each other and are parts of cylinders constituting the casing in which the electrodes are enclosed;

(b) The electrodes are thin electrodes, with a thickness that practically does not exceed one millimeter each constituted by a metal sheet only partially coated with appropriate active electrode material;

(c) The non-coated or bare parts of the electrodes that are free of active material comprise one or two marginal rims of the said electrodes;

(d) The electric connections linking the positive or negative electrodes to the respective terminals are current collectors which are constituted by the bare parts of the respective electrodes that are not coated with active materials;

(e) The electric connections linking the positive or negative electrode to the respective terminals are metal parts which are bound as by welding, for example, of bare parts of the electrodes to the respective casing components;

(f) The electrodes are spirally wound;

(g) The electrodes are insulated from each other by a porous separator and are mounted around a hollow cylinder whose external diameter exceeds one centimeter.

Other objects and features of the invention will become apparent from the following description, taken in conjunction with the accompanying drawings presented as non-limitative examples.

In the drawings:
FIGURE 1 is an axial cross-section diagrammatically showing an embodiment of the accumulator according to the invention;
FIGURE 2A is a partial front-view illustrating a manner of assembly of the accumulator shown in FIGURE 1;
FIGURE 2B is a partial side view also illustrating said manner of assembly;
FIGURE 3 is a diagrammatic showing of a different embodiment according to the invention;
FIGURE 4 is a diagrammatic view of a further embodiment;
FIGURE 5 is a diagrammatic view comprising a partially in elevation and partially in axial cross-section of another embodiment illustrating a different means for closing an accumulator embodying the invention;
FIGURE 6 is a fragmentary section of a modified means for sealing the casing ends; and
FIGURE 7 is a similar fragmentary section of a further modification.

DETAILED DESCRIPTION

Referring to the drawings, FIGURE 1 illustrates an annular alkaline accumulator or cell A of the cadmium-nickel type embodying the invention and FIGURES 2A and 2B diagrammatically show a manner of constructing of such cell. This accumulator A comprises a thin negative electrode 1 and a thin positive electrode 2 (each not exceeding 1 millimeter in thickness), separated by a porous separator 3 approximately one to three tenths of millimeter thick, which separator electrically insulates the electrodes and maintains a regular and uniform distance between them. It is to be noted that in FIGURES 2A and 2B, the lengths of the electrodes and separator have been intentionally shortened for convenience of illustration. These electrodes 1 and 2 and the separator 3 actually are spirally wound for about four turns and are enclosed in an hermetic annular container 4 together with electrolyte. In this example, the positive and negative electrodes have the same width but, of course, these dimensions could be different if desired.

The case 4 comprises an inner metal tube or cylinder 5 having a diameter of approximately a few centimeters, an outer metal cylinder or tube 6 and two ring-shaped end parts 7 both of insulating material with appropriate mechanical resistance and chemical resistance to electrolyte, set between the two cylinders 5 and 6 so as to constitute hermetic tight end joints and seals. To avoid any short-circuit hazard in the electrode winding or between the said winding and cylinders 5 and 6, the width of the separator 3 is greater than that of the active portions of the electrodes so that the separator projects over one at least of the side rims of said electrodes. For clarity in the drawings, the separator 3 has not been shown in FIGURE 2A. Electrodes 1 and 2 each are constituted by a metal sheet 8 that partially is perforated, each being, for example, a nickel plated steel sheet having a perforated area and coated over its perforated area with a sintered layer containing the required active material, i.e. cadmium hydroxide 9 for the negative electrode and nickel hydroxide 10 eventually mixed with cobalt hydroxide for the positive electrode, in such a way that the right rim 11a of the negative electrode 1 and the left rim 12 of the positive electrode 2 are kept bare, i.e. of respective active materials as is shown in FIGURE 2A. Advantageously, the bare and unperforated rims 11a and 12 are castellated in order to facilitate their being folded back for purposes hereinafter described.

The terminals of the cell A are constituted respectively by the outer meal cylinder 6 for the positive electrode and by the inner metal cylinder 5 for the negative electrode. The bare non-perforated rims of the sheets 8, i.e. 11a and 12 are free of active material and serve as current collectors respectively for negative and positive electrodes. According to another embodiment, as is shown in FIGURE 3, the rims 11' and 12' of electrodes 1' and 2' can instead have metal bits welded to respective bared portions of the electrode sheets 8, as will be presently described.

In order that an accumulator embodying the invention may be able to bear high discharge rates, the electric contact between current outlets constituted respectively by rims 11a and 12 and cylinders 5 and 6 must be of very good quality. These contacts are obtained by spot or line welding the castellated bare rims 11a and 12, respectively, as at 15 and 16 to cylinders 5 and 6 after having previously folded the castellated rims back toward their corresponding cylinders 5 and 6.

An accumulator as described can be constructed accord to the following procedure as seen in FIGURES 2A and 2B:

The inner metal cylinder or tube 5 having a diameter of a few centimeters is provided at both ends with an outwardly facing groove 17. The preferably bare end rim 11b of the negative electrode 1 is then fixed as by spot or line welding 18 to this cylinder between the ribs 17. Then the positive electrode 2 is entirely wrapped within the separator 3 and then positioned so that it lies interpolated between the secured negative electrode 1 and the cylinder 5 as shown in FIGURE 2B. Then, the electrodes 1 and 2 together with the separator 3 are spirally wound around cylinder 5 turning in the direction of arrow $f$. If any difficulty to effect the spot or line welding 18 intended to facilitate the winding should appear, it is possible alternatively to use an adhesive tape binding to affix properly the rim 11b of the negative electrode 1 on the surface of cylinder 5.

When the winding operation is over, after about four turns in the example herein described, the resulting coil is maintained in its wound position, for example, by the application of an adhesive tape binding (not shown). Then the castellated bare rims 11a are folded back and welded to cylinder 5 at spots 15 or in a line. As an alternative, the folding back and welding of bare rim 11a to cylinder 5 may be effected in successive stages as the winding operation proceeds. Then the block of wound electrodes-separator and cylinder is positioned in a second outer metal cylinder 6 of the same length as the cylinder 5 and of a diameter just sufficient to contain the said block. Then the bare rims 12 of the positive electrode 2 are folded back and welded to the cylinder 6 at spots 16 or by line welding as already described with respect to the negative electrode 1. The cylinder 6 is then provided with two grooves 19 similar to the grooves 17, but facing inwards. Suitable insulative ring-shaped portions 7 are then positioned between cylinders 5 and 6 at one of their ends and the entire assembly is pressed endwise between appropriate jaws (not shown) that serve to crimp the ends 5a and 6a over the ring 7 which is of insulating and inert material and clamp the latter between said crimped ends and the crushed grooves 17 and 19 to form an hermetical seal, the crimped edges 5a and 6a forming horizontal spaced apart borders (FIGURE 1). A suitable electrolyte is then introduced through the other still open end of the casing which is then closed by a second similar ring 7 in the same way. Alternatively, both ends of the casing could be closed simultaneously by rings 7 after having introduced the correct amount of electrolyte into the open ended casing in which is imbibed the electrodes-separator assembly.

In some cases, it may be difficult to weld either the rims 11a of the final turns of the winding or the rims 12 of the first turns of the winding respectively to cylinders 5 and 6 especially when said rims are not wide enough. Therefore, the electric contact between the rims 11a or 12 and cylinders 5 or 6 may be effected in other ways.

As for example, a first method comprises:

(a) Folding back the rim of the $n$th turn of one electrode over the rim of the $(n-1)$th turn, and welding both rims together, then folding the rim of the $(n-1)$th turn over the rim of the $(n-2)$th turn and welding both rims together, and so on, up to the inner cylinder.

(b) Folding back the rim of the 1st turn of the second electrode over the rim of the second turn and welding both rims together, and so on, up to the outer cylinder.

Another method comprises welding together the castellated parts of one electrode, two by two, or three by three, with a shift of one turn every next welding and then welding right onto both respective cylinders the nearest turns (one or more).

Another method as shown in FIGURE 3 comprises welding on the inner or outer cylinder the rim of the nearest associated turns and providing as by welding, for instance, the most remote turns with tabs 20 that are sufficiently long to be folded and welded to the corresponding cylinder. This embodiment is shown in FIGURE 3 where electrodes 1' and 2' are set head to foot prior to the winding around the inner cylinder 5'.

Another method as shown in FIG. 4 comprises fixing bare rims such as 21 and 22 whose width increases with the distance from the cylinder onto which they are to be welded. This disposition which can be used together with that of FIGURE 2A, showing castellated rims, is illustrated in the FIGURE 4 of the drawing in which, as previously, electrodes 1" and 2" are being placed head to foot prior to the winding.

A last method comprises using comb-shaped current collectors so that the teeth of such combs can come into contact with the bare electrode rims that are free of active material and can be welded on them; said combs are then welded to respective cylinders.

Of course, the electrode which is welded to the inner cylinder may be, at will, either the positive or the negative one. In this case, it is possible to ensure not only the electric contacts by spot or line welding such as described hereabove, but also a complementary contact is provided between the outer cylinder and the negative electrode owing to an extra turn of the outer electrode sheet which is bare, i.e. kept free of active material bearing frictionally against the internal face of the outer casing part 6 by natural pressure.

FIGURE 5 illustrates another possible embodiment related to the casing of such an accumulator, where an end piece 24 of metal having the shape of a gutter is welded at 24' to the edges of one of the two cylinders, for example, the inner cylinder 5''' and is fixed by crimping the edges of the second cylinder 6''' at a joint 25 made of plastic material to said piece 24. The convex shape of the piece 24 ensures a good elasticity so that it can be used to facilitate the setting of or to increase the pressure exerted on the joint 25.

Other embodiments relating to the casing of the accumulator can also be envisaged. For instance:

As shown in FIGURE 6, the use of two metal cylinders $5^{iv}$ and $6^{iv}$ of different lengths, the ends of the longer being folded back onto the shorter, an insulating part $7^{iv}$ made of plastic, for instance, being interposed for ensuring a hermetical joint for the casing and insulating the two casings from each other.

In the case of the container according to FIGURE 7, the use of metal rings $7^v$ instead of insulative rings 7 of FIGURE 1 with at least one plastic joint 26 located between the said rings and at least one of the metal cylinders $5^v$ and $6^v$ so that electric insulation of the two outlet terminals and also tightness of the joint are both secured. The joint may also be molded on the rings $7^v$.

The coating of an insulating layer (not shown) over the casing parts that are to be crimped or closed, for the purpose of again improving the tightness of the joint can be used.

Compared to conventional cylindrical accumulators with wound electrodes, ring-shaped accumulators according to the invention offer numerous advantages, among which the following can be noted:

A very advantageous arrangement of outlet terminals which can be connected, preferably by means of welding, to any metal part of the casing constituting itself one of the terminals.

A large external area improving general cooling, a fact which is not negligible as far as high discharge rates are concerned and also because electrical energy due to secondary reactions is dissipated in heat during overcharge.

Electronic and/or mechanical units can be totally or partially lodged within the inner cylinder, resulting thus in an outstanding economy of space.

This is particularly advantageous for electric motors whose grounded frame can be put directly into contact with the inner cylinder containing the motor itself, allowing, therefore, the suppression of half of electrical connections.

A diminution of rejects occurring in manufacture since thin electrodes are rather brittle and warp or break to a smaller extent when wound around cylinders of a few centimeters diameter instead of wound smaller sized stems.

The possible use of relatively thick electrodes, which is impossible with small diametered stems.

A diminution of the elastic forces tending to unroll the coil, and a better distribution of these forces so that the distance between electrodes is more regular all along the entire wound spiral.

The possibility of mounting safety valves, for example, of the type described in the French Patent No. 1,377,879 because the container may be partially made of plastic material.

The invention such as described for accumulators can also be applied to primary cells by relatively simple change in electrodes and electrolyte.

While specific embodiments of the invention have been described and shown, variations in structural detail within the scope of the appended claims are possible and are contemplated. There is no intention, therefore, of limitation to the exact abstract or disclosure herein presented.

What is claimed is:

1. An annular electrochemical accumulator comprising an open-ended inner tubular metallic casing part, a concentric open-ended outer tubular metallic casing part, said parts defining an annular space therebetween, wound opposite polarity electrodes with interposed separator means between them within the annular space between the casing parts, one of said electrodes being secured to the inner tubular part, bared current collecting means on each electrode, respectively electrically connecting the opposite polarity electrodes to the inner and outer metallic casing parts, said casing parts forming respective output terminals of said accumulator, electrolyte and sealing and insulating means secured at the ends of said casing parts to close off only both ends of said annular space and to seal such space and its contents, said open-ended inner tubular part being capable of receiving directly a load device to be powered by said accumulator and to make one direct electrical contact therewith.

2. An annular electrochemical accumulator according to claim 1, wherein said electrodes each have active electrode material bearing portions and bared portions free of active electrode material, said bared portions consisting said bared current collecting means and being electrically connected at least in spots to respective of said casing parts.

3. An annular electrochemical accumulator according to claim 1, wherein each of said electrodes comprises a metallic sheet, a portion of which carries active electrode material and castellated other portions of which are bare and free of such active electrode material, said castellated bare other portions constituting said current collecting means and being joined electrically directly to respective of said metallic casing parts.

4. An annular electrochemical accumulator according to claim 3, wherein said bare other portions are disposed at rims of the respective metallic sheets.

5. An annular electrochemical accumulator according to claim 1, wherein said one of said electrodes has a portion carrying active electrode material and a bare portion free of such active material which bare portion is that secured to the inner tubular part and wherein both said electrodes have bare rim portions constituting said current collecting means which are welded at least in spots to the respective inner and outer casing parts.

6. An annular electrochemical accumulator according to claim 1, wherein said electrodes whose thickness ranges up to approximately 1 mm. are thin metal sheets bearing active electrode material on portions thereof only, the remaining portions being bare and free of such active electrode material.

7. An annular electrochemical accumulator according to claim 1, wherein said electrodes are metal sheets each bearing active electrode materials in portions thereof with other portions bare and free of active electrode materials and wherein said collecting means comprise metal pieces secured electrically to said bare other portions and to respective of the inner and outer metallic casing parts.

8. An annular electrochemical accumulator according to claim 1, wherein said electrodes and separator are spirally wound.

9. An annular electrochemical accumulator according to claim 1, wherein said electrodes and separator are spirally wound about said inner casing part whose diameter is greater than 1 centimeter.

10. An annular electrochemical accumulator according to claim 1, wherein each electrode comprises a metal sheet bearing active electrode material and having bare side rim portions that are castellated to provide said current collecting means.

References Cited

UNITED STATES PATENTS

| | | | |
|---|---|---|---|
| 2,487,499 | 11/1949 | Webb | 136—13 |
| 3,023,260 | 2/1962 | Coler et al. | 136—13 |
| 3,081,366 | 3/1963 | Belove | 136—6 |
| 3,081,367 | 3/1963 | Field et al. | 136—6 |
| 3,250,645 | 5/1966 | Zahn et al. | 136—14 |
| 3,377,201 | 4/1968 | Wagner et al. | 136—13 |
| 3,393,095 | 7/1968 | Philipp | 136—14 |

ALLEN B. CURTIS, Primary Examiner

A. SKAPARS, Assistant Examiner

UNITED STATES PATENT OFFICE
CERTIFICATE OF CORRECTION

Patent No. 3,490,949                      January 20, 1970

Robert Marcel Deschamps

It is certified that error appears in the above identified patent and that said Letters Patent are hereby corrected as shown below:

Column 3, line 2, "meal" should read -- metal --. Column 6, line 4, "consisting" should read -- constituting --.

Signed and sealed this 16th day of June 1970.

(SEAL)
Attest:

Edward M. Fletcher, Jr.                      WILLIAM E. SCHUYLER, JR

Attesting Officer                                Commissioner of Patents